(12) United States Patent
Fisk et al.

(10) Patent No.: US 7,973,106 B2
(45) Date of Patent: Jul. 5, 2011

(54) ACRYLATE-BASED SOUND DAMPING MATERIAL AND METHOD OF PREPARING SAME

(75) Inventors: Jonathan W. Fisk, Canton, MI (US); Mark C. Thurber, Lake Orion, MI (US); David M. Sloan, Rochester Hills, MI (US); Vistasp Gheyara, Farmington Hills, MI (US); James F. Keys, Northville, MI (US)

(73) Assignee: Shiloh Industries, Inc., Valley City, OH (US)

( * ) Notice: Subject to any disclaimer, the term of this patent is extended or adjusted under 35 U.S.C. 154(b) by 935 days.

(21) Appl. No.: 11/918,420

(22) PCT Filed: Apr. 26, 2006

(86) PCT No.: PCT/US2006/015702
§ 371 (c)(1),
(2), (4) Date: Oct. 12, 2007

(87) PCT Pub. No.: WO2006/116440
PCT Pub. Date: Nov. 2, 2006

(65) Prior Publication Data
US 2009/0045008 A1    Feb. 19, 2009

Related U.S. Application Data

(60) Provisional application No. 60/674,817, filed on Apr. 26, 2005.

(51) Int. Cl.
*C08L 31/00* (2006.01)
*E04B 1/84* (2006.01)
*C08F 265/06* (2006.01)

(52) U.S. Cl. ......... 524/556; 181/286; 181/294; 525/309
(58) Field of Classification Search ............... 524/556; 525/309; 181/286, 294
See application file for complete search history.

(56) References Cited

U.S. PATENT DOCUMENTS

| 2,196,615 A | 4/1940 | Suprenant |
| 2,237,623 A | 4/1941 | Ledwinka |

(Continued)

FOREIGN PATENT DOCUMENTS

JP    09151292 A    *    6/1997

(Continued)

OTHER PUBLICATIONS

Written Opinion & International Search Report for PCT/US06/15702, Oct. 23, 2006, 7 pages.

(Continued)

*Primary Examiner* — Michael M Bernshteyn
(74) *Attorney, Agent, or Firm* — Reising Ethington P.C.; Michael C. Adams (57) ABSTRACT

A sound damping material for use in a sound damping laminate having one or more rigid layers, such as those used in the automotive industry. The sound damping material is preferably a viscoelastic material that damps or otherwise inhibits the transmission of vibrational or acoustical energy through the laminate, and also acts as an adhesive for bonding the rigid layers together. In its cured form, the sound damping material layer can include an acrylate-based polymer matrix, and one or more of the following components: a precipitated phase, a viscous phase, and miscellaneous constituents. The acrylate-based polymer matrix is the reaction product of at least one acrylate-based monomer, such as isobornyl acrylate.

17 Claims, 1 Drawing Sheet

U.S. PATENT DOCUMENTS

| | | | |
|---|---|---|---|
| 2,355,568 A | 8/1944 | Smith | |
| 2,576,073 A | 11/1951 | Kropka et al. | |
| 2,819,032 A | 1/1958 | Detrie et al. | |
| 3,352,742 A | 11/1967 | Zunich et al. | |
| 3,382,136 A | 5/1968 | Bugel et al. | |
| 3,489,242 A | 1/1970 | Gladdling et al. | |
| 3,511,741 A | 5/1970 | Elder | |
| 3,547,756 A | 12/1970 | Oberst et al. | |
| 3,547,759 A | 12/1970 | Oberst et al. | |
| 3,547,760 A | 12/1970 | Oberst et al. | |
| 3,562,090 A | 2/1971 | Oberst et al. | |
| 3,562,091 A | 2/1971 | Oberst et al. | |
| 3,562,092 A | 2/1971 | Oberst et al. | |
| 3,605,953 A | 9/1971 | Caldwell et al. | |
| 3,634,299 A | 1/1972 | Shim et al. | |
| 3,642,954 A | 2/1972 | Turner | |
| 3,649,430 A | 3/1972 | Lewis et al. | |
| 3,668,635 A | 6/1972 | Mizobuchi et al. | |
| 3,674,624 A | 7/1972 | Oberst et al. | |
| 3,674,625 A | 7/1972 | Oberst et al. | |
| 4,223,073 A | 9/1980 | Caldwell et al. | |
| 4,313,996 A | 2/1982 | Newman et al. | |
| 4,447,493 A | 5/1984 | Driscoll et al. | |
| 4,594,292 A | 6/1986 | Nagai et al. | |
| 4,599,261 A | 7/1986 | Hart et al. | |
| 4,678,707 A | 7/1987 | Shinozaki et al. | |
| 4,681,816 A | 7/1987 | Hashimoto et al. | |
| 4,788,099 A | 11/1988 | Fukushima et al. | |
| 4,851,271 A | 7/1989 | Moore, III et al. | |
| 4,883,717 A | 11/1989 | Kitamura et al. | |
| 4,942,080 A | 7/1990 | Heuel et al. | |
| 4,952,610 A | 8/1990 | Moore, III et al. | |
| 5,008,324 A | 4/1991 | Killgoar, Jr. et al. | |
| 5,063,098 A | 11/1991 | Niwa et al. | |
| 5,066,708 A | 11/1991 | Koller, Sr. et al. | |
| 5,093,204 A | 3/1992 | Watanabe et al. | |
| 5,118,562 A | 6/1992 | Johnson et al. | |
| 5,143,755 A | 9/1992 | Moore, III et al. | |
| 5,213,879 A | 5/1993 | Niwa et al. | |
| 5,233,832 A | 8/1993 | Moore, III | |
| 5,258,972 A | 11/1993 | Brasfield et al. | |
| 5,262,232 A | 11/1993 | Wilfong et al. | |
| 5,271,142 A | 12/1993 | Moore, III et al. | |
| 5,308,887 A | 5/1994 | Ko et al. | |
| 5,347,810 A | 9/1994 | Moore, III | |
| 5,407,034 A | 4/1995 | Vydra et al. | |
| 5,411,810 A | 5/1995 | Hirakouchi et al. | |
| 5,416,962 A | 5/1995 | Passarella | |
| 5,418,073 A | 5/1995 | Loth et al. | |
| 5,464,659 A | 11/1995 | Melancon et al. | |
| 5,474,840 A | 12/1995 | Landin | |
| 5,552,209 A | 9/1996 | McCutcheon | |
| 5,557,078 A | 9/1996 | Holwerda | |
| 5,590,524 A | 1/1997 | Moore, III et al. | |
| 5,624,763 A | 4/1997 | Melancon et al. | |
| 5,631,451 A | 5/1997 | Torisaka et al. | |
| 5,654,387 A | 8/1997 | Bennett et al. | |
| 5,670,006 A | 9/1997 | Wilfong et al. | |
| 5,691,037 A | 11/1997 | McCutcheon et al. | |
| 5,744,557 A | 4/1998 | McCormick et al. | |
| 5,796,055 A | 8/1998 | Benson, Jr. et al. | |
| 5,842,686 A | 12/1998 | Hansen et al. | |
| 5,851,342 A | 12/1998 | Vydra et al. | |
| 5,856,022 A | 1/1999 | McCormick et al. | |
| 5,863,664 A | 1/1999 | McCormick et al. | |
| 5,922,264 A | 7/1999 | Shimmell | |
| 5,955,149 A | 9/1999 | Kuziemka | |
| 5,965,249 A | 10/1999 | Sutton et al. | |
| 5,975,609 A | 11/1999 | Campbell | |
| 6,011,130 A | 1/2000 | Arai et al. | |
| 6,024,190 A | 2/2000 | Ritzema | |
| 6,069,214 A | 5/2000 | McCormick et al. | |
| 6,069,219 A | 5/2000 | McCormick et al. | |
| 6,089,349 A | 7/2000 | Aye | |
| 6,092,854 A | 7/2000 | Campbell | |
| 6,103,152 A | 8/2000 | Gehlsen et al. | |
| 6,109,481 A | 8/2000 | Alexander et al. | |
| 6,110,985 A | 8/2000 | Wheeler | |
| 6,177,173 B1 | 1/2001 | Nelson | |
| 6,197,114 B1 | 3/2001 | Rodenberger | |
| 6,202,462 B1 | 3/2001 | Hansen et al. | |
| 6,302,466 B1 | 10/2001 | Zwick | |
| 6,309,985 B1 | 10/2001 | Virnelson et al. | |
| 6,332,509 B1 | 12/2001 | Nishikawa et al. | |
| 6,368,432 B2 | 4/2002 | Serizawa et al. | |
| 6,465,110 B1 | 10/2002 | Boss et al. | |
| 6,481,545 B1 | 11/2002 | Yano et al. | |
| 6,503,974 B1 | 1/2003 | Ogasawara et al. | |
| 6,589,607 B1 | 7/2003 | Edwards et al. | |
| 6,601,909 B2 | 8/2003 | Obara et al. | |
| 6,621,658 B1 | 9/2003 | Nashif | |
| 6,722,720 B2 | 4/2004 | Donick et al. | |
| 6,875,278 B2 | 4/2005 | Kerbel et al. | |
| 6,887,314 B2 | 5/2005 | Edwards et al. | |
| 7,040,691 B1 | 5/2006 | Jacobs et al. | |
| 7,070,848 B2 | 7/2006 | Campbell | |
| 7,094,478 B1 | 8/2006 | Griffey et al. | |
| 7,105,601 B2 | 9/2006 | Guo et al. | |
| 7,125,613 B1 | 10/2006 | Tullis et al. | |
| 7,172,800 B2 | 2/2007 | Boss | |
| 7,186,442 B2 | 3/2007 | Myers et al. | |
| 7,218,189 B2 | 5/2007 | Pahl | |
| 7,288,290 B2 | 10/2007 | Chao et al. | |
| 7,291,241 B2 | 11/2007 | Dunlap | |
| 7,360,520 B2 | 4/2008 | Tullis et al. | |
| 7,364,221 B2 | 4/2008 | Tahri et al. | |
| 7,393,575 B2 | 7/2008 | Boss | |
| 2004/0018353 A1 | 1/2004 | Czaplicki et al. | |
| 2004/0058181 A1 | 3/2004 | Garnault et al. | |
| 2004/0076841 A1 | 4/2004 | Sauer et al. | |
| 2004/0091723 A1 | 5/2004 | Engels et al. | |
| 2004/0110905 A1 | 6/2004 | Kubota et al. | |
| 2004/0138321 A1 | 7/2004 | Hashimoto et al. | |
| 2004/0214008 A1 | 10/2004 | Dobrusky et al. | |
| 2005/0019590 A1 | 1/2005 | Josefsson | |
| 2006/0062998 A1 | 3/2006 | Taylor et al. | |
| 2006/0134449 A1 | 6/2006 | Sigler et al. | |
| 2006/0137944 A1 | 6/2006 | Denys | |
| 2006/0169341 A1 | 8/2006 | Goetchius et al. | |
| 2006/0169557 A1 | 8/2006 | Goetchius | |
| 2006/0266385 A1 | 11/2006 | Malaker | |
| 2007/0026212 A1 | 2/2007 | Nashif et al. | |
| 2007/0088121 A1 | 4/2007 | Miyawaki et al. | |
| 2007/0104966 A1 | 5/2007 | Calvez et al. | |
| 2007/0186614 A1 | 8/2007 | Pinard | |
| 2007/0197713 A1 | 8/2007 | Miyawaki et al. | |
| 2007/0281095 A1 | 12/2007 | Hoefflin et al. | |
| 2008/0000300 A1 | 1/2008 | Goetchius | |
| 2008/0149901 A1 | 6/2008 | Choi et al. | |

FOREIGN PATENT DOCUMENTS

| | | |
|---|---|---|
| JP | 9151292 | 10/1997 |

OTHER PUBLICATIONS

Database WPI Week 199733; Derwent Publications Ltd., London, GB; AN 1997-359203, XP002401604.

\* cited by examiner

Figure 1

Figure 2

ACRYLATE-BASED SOUND DAMPING MATERIAL AND METHOD OF PREPARING SAME

REFERENCE TO RELATED APPLICATIONS

This application claims the benefit of U.S. Provisional Ser. No. 60/674,817 filed on Apr. 26, 2005.

FIELD OF INVENTION

The present invention generally relates to sound damping materials, and more particularly, to acrylate-based, viscoelastic sound damping materials that can be used in laminates, such as those used in the automotive industry.

BACKGROUND OF THE INVENTION

Sound damping materials have been used in a variety of applications and industries, including the automotive industry. Oftentimes, articles that have been damped for sound include some type of viscoelastic material applied to a vibratory article, such as an automotive oil pan. The viscoelastic material absorbs and dissipates the vibrational energy generated by the article by converting mechanical energy associated with the vibrations into thermal energy that is dispersed within the sound damping material layer, and thus reduces the noise associated therewith. There are several different structures commonly used for sound damping purposes, including: free-layer structures, constrained-layer structures and laminates.

Free-layer structures are structures where a sound damping viscoelastic material by itself is applied to the surface of a vibratory article. In such an arrangement, vibratory or acoustical energy created by a noise or vibration source on one side of the article is dissipated in the adjacent viscoelastic layer so that it is not transmitted to the other side of the structure. In the case of constrained-layer structures, the sound damping viscoelastic material acts as an adhesive and is sandwiched between the vibratory article and an additional rigid constraining layer. The vibration damping is generally due to relative movement between the vibratory article and the rigid constraining layer which causes a shearing movement in the viscoelastic material. The shearing movement translates the vibrational energy into heat energy which is then dissipated through the rigid constraining layers. Sound damping laminates generally perform much in the same way as constrained-layer structures, however the vibratory article includes a pair of thin constraining layers and a viscoelastic material.

In addition to their vibration-reducing attributes, sound damping structures like those mentioned above can also exhibit a number of other desirable performance characteristics. For instance, sound damping structures have been known to exhibit certain structural and thermal-resistance characteristics that are desirable for a variety of applications.

SUMMARY OF THE INVENTION

According to one aspect of the invention, there is provided a sound damping material for use in a sound damping structure having at least one rigid layer. The sound damping material includes: an acrylate-based polymer matrix that adheres to the rigid layer(s) of the sound damping structure and is the reaction product of at least one acrylate-based monomer, one or more curing agents dispersed in the acrylate-based polymer matrix, and at least one material selected from the group consisting of a precipitated phase and a viscous phase. Wherein, the precipitated phase is a rubber-like material that provides elasticity to the sound damping material and is dispersed in the acrylate-based polymer matrix, and the viscous phase is a fluidic or semi-fluidic material that provides viscosity to the sound damping material and is dispersed in the acrylate-based polymer matrix.

According to another aspect of the invention, there is provided a method for preparing a sound damping material for application to one or more rigid layers of a sound damping structure.

According to another aspect of the invention, there is provided a method for producing a sound damping laminate.

DESCRIPTION OF THE DRAWINGS

These and other objects, features and advantages of this invention will be apparent from the following detailed description of the preferred embodiments and best mode, the appended claims, and the accompanying drawings, in which:

DESCRIPTION OF PREFERRED EMBODIMENTS

Figure 1:
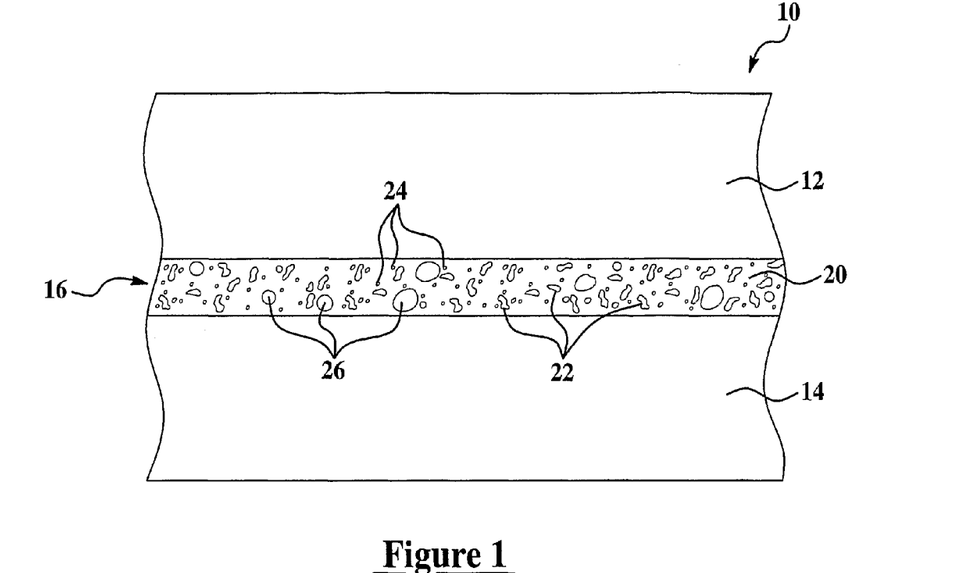
FIG. 1 shows a diagrammatic cross-sectional view of an embodiment of a sound damping metal laminate, including two rigid layers and a sound damping material layer.

With reference to FIG. 1, there is shown a cross-section of an embodiment of a sound damping metal laminate 10 comprising two rigid layers 12, 14 and a sound damping material layer 16 sandwiched there between. Sound damping metal laminate 10 is an inherently damped structure that can be utilized in a number of different applications, however, it is particularly well suited for automotive applications such as oil pans, dash panels, body panels, door panels, floor pans, roofs, etc., as well as any other structural component where it is desirable to reduce the vibrational or acoustical energy in a part. In such applications, it is anticipated that the sound damping metal laminate 10 will be stamped, rolled, drawn, pressed, punched, cut, welded or otherwise processed in order to form the structural component. Although the following description is directed to a sound damping laminate, it should be appreciated that sound damping material layer 16 could just as easily be used in a free-layer structure where it is applied by itself to a vibratory article, in a constrained-layer structure where it is sandwiched between a vibratory article and an additional rigid constraining layer, or in any other sound damping structure designed to minimize vibrations therein.

Rigid layers 12 and 14 are preferably made of standard cold rolled steel, but could be constructed from any other suitable metallic or nonmetallic materials. For instance, stainless steel, aluminum, rigid plastic, composite, ceramic, glass or natural materials could be used. Furthermore, rigid layers 12 and 14 can be made of the same or different materials, they can have the same or different thicknesses, they can be surface treated or untreated, and they can include more than two rigid layers, just to list a few of the possibilities. According to a preferred embodiment, rigid layers 12 and 14 each have a thickness between 0.015" and 0.040" and sound damping material layer 16 has a thickness between 0.0005"-0.002", which makes the overall thickness of sound damping metal laminate 10 approximately between 0.030" and 0.080".

Sound damping material layer 16 is preferably a viscoelastic material that damps or otherwise inhibits the transmission of vibrational or acoustical energy through laminate 10, and also acts as an adhesive for bonding the rigid layers 12 and 14 together. In its cured form, sound damping material layer 16 preferably includes a polymer matrix 20, and one or more of the following components: a precipitated phase 22, a viscous phase 24, and miscellaneous constituents 26. According to different embodiments, the sound damping material layer 16 can include one of any number of combinations of these components.

Polymer matrix 20 is an acrylate-based, viscoelastic material that is at least partially cross-linked such that it provides the main adhesive bond strength for sound damping material layer 16. The polymer matrix is the reaction product of at least one acrylate-based monomer and, according to one embodiment, at least one additional acrylate-based oligomer, and comprises 10%-95%, by weight, of the sound damping material layer 16. This encompasses those embodiments where the reaction products include one or more acrylate-based monomer(s) and no acrylate-based oligomers, as well as those having one or more acrylate-based monomer(s) and one or more acrylate-based oligomer(s). The monomers and oligomers preferably undergo a certain amount of cross-linking when the polymer matrix phase 20 is polymerized.

The term "acrylate-based monomer" broadly includes all esters of acrylic and methacrylic acid, including all such having di-, tri- or tetra-acrylates or methacrylates, or any other component having acrylic and/or methacrylic functionality as the reaction site. It is desirable for the acrylate-based monomer to function as an effective solvent with respect to the other constituents of the sound damping material layer 16. Thus, it is preferable that the acrylate-based monomer have a molecular weight of between 100 and 400 (Mw), as materials with a lower molecular weight tend to be better at dissolving a solute. Examples of specific types of acrylate-based monomers are provided in Table I, however, these are only some examples. It should be appreciated that the methacrylate-analogs of the materials in Table I, as well as other acrylate-based monomers known to those skilled in the art, could also be used as acrylate-based monomers. One group of acrylate-based monomers that is particularly suitable for use are isobornyl-based acrylates, such as the isobornyl acrylate SR506 sold by Sartomer Company, Inc.

TABLE I 1,3-butylene glycol diacrylate
1,4-butanediol diacrylate
1,6 hexanediol diacrylate
1,6 hexanediol acrylate
2(2-ethoxyethoxy) ethyl acrylate
2-phenoxyethyl acrylate
alkoxylated hexanediol diacrylate
allyl acrylate
cyclic trimethylolpropane formal acrylate
diethylene glycol diacrylate
ethoxytriglycol acrylate
ethylene glycol diacrylate
isobornyl acrylate
isodecyl acrylate
isooctyl acrylate
lauryl acrylate
polyethylene glycol diacrylate
stearyl acrylate
tetraethylene glycol diacrylate
tetraethylene glycol acrylate
tetrahydrofurfuryl acrylate
tridecyl acrylate
triethylene glycol diacrylate
trimethylolpropane triacrylate Similarly, the term "acrylate-based oligomer" broadly includes all oligomers formed from at least one "acrylate-based monomer" and at least one additional acrylate-based or non-acrylate based monomer. Preferably, the acrylate-based oligomer has two or more acrylic functional sites and includes a non-acrylate based monomer, such as a urethane. Testing has shown that it is preferable that the acrylate-based oligomer have: a room temperature viscosity of between 500 and 50,000 cPs which aids in the workability or application of sound damping material layer 16, a glass transition temperature (Tg) of between −44° C. to 185° C. which tends to improve the damping performance of the sound damping material layer within an operating temperature range, and a molecular weight of between 1,000-5,000 (Mw). With reference to Table II, there is provided a list of exemplary acrylate-based oligomers. Again, other acrylate-based oligomers known in the art, including the methacrylate-analogs of those listed in Table II, could be used as well. One group of acrylate-based oligomers that have proven to be particularly effective are urethane-based acrylates, such as the aromatic polyester-based urethane diacrylate oligomer CN973J75 sold by Sartomer Company, Inc. This material has a viscosity of 6,560 cPs at 60° C. and a glass transition temperature of −31° C.

TABLE II acrylic oligomer
aliphatic allyl oligomer
aliphatic urethane acrylate/diacrylate oligomer
amine-modified epoxy acrylate oligomer
aromatic urethane acrylate oligomer
epoxidized soy bean oil acrylate oligomer
epoxy acrylate oligomer
epoxy novolak acrylate oligomer
fatty acid modified epoxy acrylate oligomer
glycol diacrylate oligomer
halogenated polyester acrylate oligomer
halogenated urethane acrylate oligomer
hexafunctional urethane acrylate oligomer
polyether acrylate oligomer
trifunctional urethane acrylate oligomer
urethane acrylate oligomer Precipitated phase 22 is preferably a rubber-like material dispersed within polymer matrix 20, and is designed to provide sound damping material layer 16 with a certain amount of elasticity. The precipitated phase is at least partially amorphous, and can experience a certain amount of cross-linking with one or more of the other components of the sound damping material layer 16. Precipitated phase 22 is not present in all embodiments of the sound damping material layer 16; but in those embodiments where it is present, it preferably makes up between 1%-40% of the sound damping material layer, by weight. According to a preferred embodiment, precipitated phase 22 has a relatively low molecular weight of between 4,000-10,000 (Mw), which aids in the dissolution of the precipitate in polymer matrix 20 but does not significantly degrade the adhesion characteristics of the sound damping material layer 16. The precipitated phase 22 is preferably an elastic rubber-like material, but can be any one of the exemplary materials listed in Table III as well as others known in the art. Through testing, it is been determined that one group of materials that is especially well suited for use as the precipitated phase is the rubber products sold by Kraton Polymers, such as the FG1901X class rubber. It should be noted that precipitated phase materials are sometimes selected based on their sound damping characteristics as they relate to temperature. Thus, high temperature applications, such as automotive oil pans, require precipitated phase 22 constituents that perform well in elevated temperature environments, while ambient temperature applications have different requirements.

TABLE III chlorinated ethylene acid copolymer
chlorosulfonated polyethylene
ethylene copolymers
ethylene propylene dimethacrylate
ethylene/methyl acrylic copolymer
ethylene-vinyl acetate terpolymer
maleated styrene-ethylene/butalene-styrene block copolymer
neoprene
nitrile rubber
polybutadiene
polyisoprene
polyurethane
polyvinyl chloride
styrenic block copolymers Viscous phase 24 (represented diagrammatically in FIG. 1) is a generally fluidic or semi-fluidic material that is dispersed within polymer matrix 20 and affects the viscosity of the sound damping material layer 16. The viscous phase is at least partially amorphous, as crystalline regions tend to prevent or inhibit movement of the material under pressure, and is preferably miscible so that it dissolve in the polymer matrix 20. In addition to improving vibrational energy dissipation, viscous phase 24 can also increase the bond strength of the sound damping material layer. The viscous phase is not present in all embodiments of the sound damping material layer 16; but when it is present, it comprises about 5%-60% of the sound damping material layer 16, by weight. By way of example, suitable viscous phase materials include substances like oils, greases, rosins, terpines, tars, asphaltic materials, as well as those listed in Table IV. Again, it should be noted that the materials listed are only exemplary materials, as other alternative materials could be used as well. According to empirical testing, viscous phase 24 performs best when it has a room temperature viscosity between 1,000-1,000,000 cPs. One group of viscous phase materials that is particularly well suited for use is acrylic copolymers, such as SM750 sold by Schnee-Morehead.

TABLE IV acrylic polymer/copolymer/terpolymer
asphaltic resin
ethyl acrylate 2-ethylhexyl acrylate
fatty acids
gelatin resin
glycol resins
hydrocarbon resins
isobutylene
methacrylic polymer/copolymer/terpolymer
parrafinic resin
petroleum resin
polyamide resin
polybutadienes, uncured
polybutene
polyisocianate derivaive
polyolefin resin
polyurethane resin
simethicone
tall oil
terpene resin In addition to the various phases and components listed above, the precursor materials for sound damping material layer 16 can also include a number of miscellaneous ingredients 26, including fillers, curing agents, conductive particles, etc. For instance, a number of conductive particles such as metallic, carbon black, graphite, carbon nanotubes, nickel, nickel-alloy and/or nickel-coated carbon particles can be added to the sound damping material layer 16 in order to enhance the conductivity through the sound damping material and between rigid layers 12 and 14. This can be particularly beneficial when sound damping metal laminate 10 is used in processes like resistance welding, etc. Furthermore, inexpensive filler material of various sizes and shapes can be added to the sound damping material layer 16, as well as, suitable curing agents for heat-activated, anaerobic-activated, chemically-activated, catalytically-activated and/or UV-activated curing. Some examples of suitable curing agents are provided in Table V, however, this list is not exclusive, as other alternative agents and materials could also be used.

TABLE V 1,1,di-(tert-butylperoxy)-3,3,5-trimethylcyclohexane
l,2-dihydro-2-ketobenzisosulfonazole
1,3,4-thiadiazole
2,4,6,tri(dimethylaminomethyl) phenol
2,5-dimethyl-2,5-di(t-butyl-peroxy)hexane
2-hydroxy-2-methyl-1-phenyl-1-propane
2-mercaptobenzothiazole
amine curatives
bismuth dimethyldithiocarbamate
cadmium diethyldithiocarbamate
cumyl hydroperoxide
dibenzoylperoxide
dilauryl peroxide
dimyristylperoxydicarbonate
diphenylmethane diisocyanate
dithiocarbamate
hexamethlenediamine carbamate
hydroperoxide curatives
magnesium oxide
m-phenylenedimaleimide
n,n,diethyl-p-toluidine
n,n,dimethyl-p-toluidine
n,n'-di-ortho-tolylguanidine
n,n'-diphenylguanidine
n,n,m phenylene dimalimide
n-butyl-4,4-bis(t-butylperoxy)valerate
peroxide curatives
tetraisobutyl thiuram disulfide
trimethylthiourea
zinc oxide The sound damping material disclosed herein will be more fully understood in view of the following, non-limiting examples of some preferred embodiments. Sound damping materials can be tuned or tailored for certain attributes by adjusting their constituent materials, as well as the materials' respective weights. For instance, Examples I, II, III and IV have been found to perform well in ambient temperature conditions, typically between 0° C. and 60° C., especially in peel strength which measures the strength of the material's adhesion. Thus, they are particularly well suited for applications in which the temperature is maintained near ambient; such as applications for dash panels, body panels, door panels, floor pans, roofs, etc. Conversely, Examples V, VI and VII perform well in high temperature conditions, usually between about 50° C. and 110° C., such as those experienced by vehicle oil pans. Damping performance within these temperature ranges is typically measured as Composite Loss Factor (CLF), as described in the specifications SAE J1637 and/or ASTM E756. Preferably, sound damping laminate 10 damps sound to an extent greater than 0.1 CLF within a frequency range of 100 Hz to 1,000 Hz.

EXAMPLE I

| Acrylate-Based Polymer Matrix | |
|---|---|
| isobornyl acrylate ester (first acrylate-based monomer) | 10-40% wt |
| polyethylene glycol dimethacrylate (second acrylate-based monomer) | 10-20% wt |
| aromatic urethane acrylate (acrylate-based oligomer) | 25-40% wt |
| Precipitated Phase | |
| chlorosulfonated polyethylene | 5-25% wt |
| Solid Particles | |
| ceramic microspheres | 1-5% wt |
| Viscous Phase | |
| none | |
| Curing Agents, Stabilizers, etc. | |
| dilauryl peroxide | 0.2-2% wt |
| 1,1-di(tert-butylperoxy)-3,5,5,trimethyl-cyclohexane | 0.2-2% wt |
| N,N,dimethyl-p-toluidine | 0.1-1.0% wt |

EXAMPLE II

| Acrylate-Based Polymer Matrix | |
|---|---|
| isobornyl acrylate ester (first acrylate-based monomer) | 1-25% wt |
| 2(2-ethoxyethoxy) ethyl acrylate (second acrylate-based monomer) | 1-10% wt |
| urethane acrylate (acrylate-based oligomer) | 70-95% wt |
| Precipitated Phase | |
| None | |
| Viscous Phase | |
| acrylic terpolymer | 1-10% wt |
| Curing Agents, Conductive Particles, etc. | |
| dilauryl peroxide | 0.1-2% wt |
| 1,1-di(tert-butylperoxy)-3,5,5,trimethyl-cyclohexane | 0.1-2% wt |
| dimyristylperoxydicarbonate | 0.1-5% wt |
| mixture (monochlororbenzene, diphenylmethanediisocyanate and phenyl isocyanate) | 0.1-5% wt |
| Nickel or Nickel-alloy particles | 0.1-5% wt |

EXAMPLE III

| Acrylate-Based Polymer Matrix | |
|---|---|
| isobornyl acrylate ester (acrylate-based monomer) | 1-25% wt |
| urethane acrylate (acrylate-based oligomer) | 70-95% wt |

| Precipitated Phase | |
|---|---|
| None | |
| Viscous Phase | |
| acrylic terpolymer | 1-10% wt |
| Curing Agents, Conductive Particles, etc. | |
| dilauryl peroxide | 0.1-2% wt |
| 1,1-di(tert-butylperoxy)-3,5,5,trimethyl-cyclohexane | 0.1-2% wt |
| dimyristylperoxydicarbonate | 0.1-5% wt |
| mixture (monochlororbenzene, diphenylmethanediisocyanate and phenyl isocyanate) | 0.1-5% wt |
| Nickel or Nickel-alloy particles | 0.1-5% wt |

EXAMPLE IV

| Acrylate-Based Polymer Matrix | |
|---|---|
| isobornyl acrylate ester (first acrylate-based monomer) | 5-30% wt |
| Trifunctional Acid Ester (second acrylate-based monomer) | 1-10% wt |
| urethane acrylate (acrylate-based oligomer) | 70-90% wt |
| Precipitated Phase | |
| None | |
| Viscous Phase | |
| acrylic terpolymer | 1-10% wt |
| Curing Agents, Conductive Particles, etc. | |
| dilauryl peroxide | 0.1-2% wt |
| 1,1-di(tert-butylperoxy)-3,5,5,trimethyl-cyclohexane | 0.1-2% wt |
| dimyristylperoxydicarbonate | 0.1-5% wt |
| mixture (monochlororbenzene, diphenylmethanediisocyanate and phenyl isocyanate) | 0.1-5% wt |
| Nickel or Nickel-alloy particles | 01-15% wt |

EXAMPLE V

| Acrylate-Based Polymer Matrix | |
|---|---|
| isobornyl acrylate ester (acrylate-based monomer) | 20-60% wt |
| Precipitated Phase | |
| chlorosulfonated polyethylene | 5-25% wt |
| Solid Particles | |
| ceramic microspheres | 1-5% wt |
| Viscous Phase | |
| acrylic copolymer | 5-60% wt |
| Curing Agents, Stabilizers, etc. | |
| n,n,m phenylene dimalimide | 0.2-2% wt |
| 1,1-di(tert-butylperoxy)-3,5,5,trimethyl-cyclohexane | 0.2-4% wt |
| n,n dimethyl-p-toluidine | 0.1-1.0% wt |

EXAMPLE VI

| Acrylate-Based Polymer Matrix | |
|---|---|
| isobornyl acrylate ester (first acrylate-based monomer) | 20-60% wt |
| 2(2-ethoxyethoxy) ethyl acrylate (second acrylate-based monomer) | 5-25% wt |
| trifunctional acid ester (third acrylate-based monomer) | 0-2% wt |
| Precipitated Phase | |
| chlorosulfonated polyethylene | 5-25% wt |
| Viscous Phase | |
| none | |
| Curing Agents, Stabilizers, etc. | |
| dilauryl peroxide | 0.1-2% wt |
| 1,1-di(tert-butylperoxy)-3,5,5,trimethyl-cyclohexane | 0.2-4% wt |
| dimyristylperoxydicarbonate | 0.1-5% wt |
| mixture (monochlororbenzene, diphenylmethanediisocyanate and phenyl isocyanate) | 0.1-5% wt |

EXAMPLE VII

| Acrylate-Based Polymer Matrix | |
|---|---|
| isobornyl acrylate ester (first acrylate-based monomer) | 40-70% wt |
| 2(2-ethoxyethoxy) ethyl acrylate (second acrylate-based monomer) | 10-25% wt |
| Precipitated Phase | |
| styrene ethylene/butylene copolymer | 5-25% |
| Viscous Phase | |
| None | |
| Curing Agents, Conductive Particles, etc. | |
| dilauryl peroxide | 0.1-2% wt |
| 1,1-di(tert-butylperoxy)-3,5,5,trimethyl-cyclohexane | 0.1-2% wt |
| dimyristylperoxydicarbonate | 0.1-5% wt |
| mixture (monochlororbenzene, diphenylmethanediisocyanate and phenyl isocyanate) | 0.1-5% wt |
| N,N,M Phenylene dimalimide | 0.1-2.5 |
| Nickel or Nickel-alloy particles | 0-5% wt |

Testing has shown that Examples II, II and IV, each of which includes 1-30% wt. of isopropyl acryl ate (acryl ate-based monomer), 70-95% wt. of urethane acryl ate (acryl ate-based bloomer), and 1-10% wt. of acrylic terpolymer (viscous phase), damp sound in a frequency range of 100 Hz to 1,000 Hz to an extent greater than 0.1 CLF when in temperature conditions of 0° C. to 60° C. Examples V, VI and VII, on the other hand, each includes 20-70% wt. of isobornyl acrylate (acrylate-based monomer) and 5-25% wt. of either chlorosulfonated polyethylene or styrene ethylene/butylene copolymer (precipitated phase), and damp sound in a frequency range of 100 Hz to 1,000 Hz to an extent greater than 0.1 CLF when in temperature conditions of 50° C. to 110° C.

Figure 2:
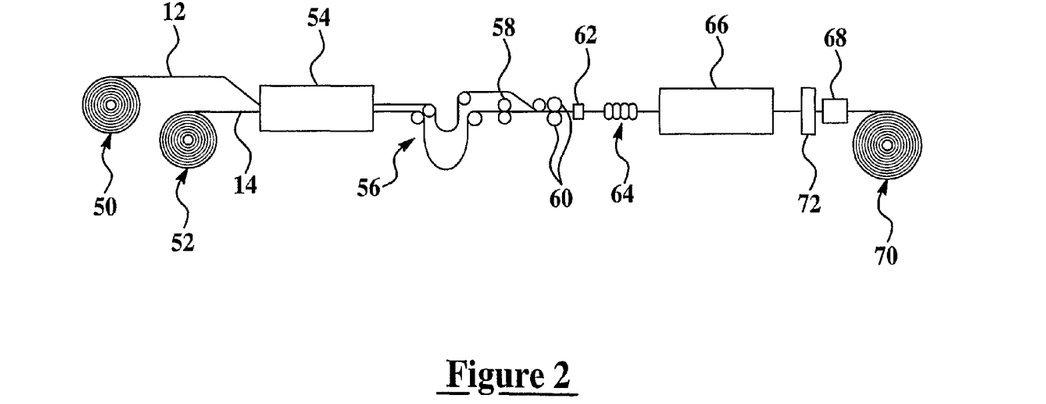
FIG. 2 shows a diagrammatic view of an embodiment of a laminating process for preparing the sound damping metal laminate of FIG. 1.

With reference now to FIG. 2, there is shown a diagrammatic view of an embodiment of a laminating process for preparing sound damping metal laminate 10. Generally, the sound damping material layer 16 is first made according to a preparation process, and is then applied to one or more rigid layers 12, 14 of the sound damping metal laminate 10 according to the laminating process shown in FIG. 2.

According to the preparation process for sound damping material 16, the acrylate-based polymer matrix phase 20 is made by mixing one or more suitable acrylate-based monomer(s) and/or acrylic-based oligomers(s) such that a fluidic or semi-fluidic solution is formed. Viscous phase 24 and precipitated phase 22 are then added and dissolved in the solution. Phases 22 and 24 may be added at the beginning, near the middle, or at the end of the mixing step, depending on the stability of the solution being formed. The curing agents and stabilizers can be added during the middle or at the end of the mixing process, depending on the miscibility and compatibility of the materials, as well as the time and temperature profiles of the various mixing stages. Any remaining components such as solid particles, conductive particles, etc. can be added at the end of the mixing process.

According to the lamination process for the sound damping metal laminate shown in FIG. 2, sound damping material layer 16 is applied to lower rigid layer 14, the two rigid layers 12 and 14 are brought together with the sound damping material layer sandwiched therebetween, the sound damping material is cured, and a sound damping metal laminate 10 is created. It is desirable, although not necessary, that the rigid or steel layers 12 and 14 be similar in their mechanical properties such as in composition, yield strength, thickness, etc. Metal rolls delivered from steel mills sometimes vary in the physical properties and it is not always satisfactory to simply select two coils of the same type of steel to be used as the top and bottom rigid layers. Thus, it is preferable to take a single sheet of steel and have it undergo a slitting operation that splits it either along its length or across its width so that the newly formed halves can be used as the upper and lower steel layers 12 and 14; this ensures uniformity between the steel layers. As previously mentioned, there are some applications where it is advantageous to have the rigid layers be made from different metals or have unequal thicknesses or both. Once the upper and lower steel layers 12 and 14 have undergone the slitting operation, they are cleaned to remove any excess oil and contaminants, recoiled and loaded onto uncoilers 50 and 52.

In a first stage, uncoilers 50 and 52 unwind the rolls of sheet metal which form steel layers 12 and 14, respectively. The steel layers then pass through a wash and/or preheat station 54 where they are each washed of any contaminants and are preferably brought to a temperature that is more suitable for applying the sound damping material layer 16. This temperature is generally above ambient but below the temperature required for curing the sound damping material. Increasing the temperature above ambient has several desirable effects, including: reducing process variations by ensuring more consistent steel layer temperatures, (ambient temperatures can vary from summer to winter), improving the wet-out of the sound damping material layer 16 on the steel layer surface due to its lower viscosity at higher temperatures, and reducing the amount of heat input and time required for the polymers to fully react once laminated (improved green strength), to name but a few benefits. Even in view of these benefits, it should be recognized that the preheat station is optional and could be omitted.

The heated steel layers 12 and 14 then go through a orientation-aligning looping pit 56. During this phase, any misalignment between the upper and lower steel layers 12 and 14 can be taken into account with the excess material present in the looping pit. Next, roll coater 58 applies a thin film of sound damping material 16 to an upper surface of lower steel layer 14. According to different laminating process embodiments, the sound damping material layer 16 can be provided as a solvent-borne, water-borne or 100% reactable material, it can be provided in solid film form as well as liquid form, it can be applied to both the top and bottom steel layers 12 and 14, and it can be applied via spray nozzles (fixed or traversing), draw down rod, or other application techniques known to those skilled in the art. One challenge for the coating step is uniformity, as it is desirable to apply the sound damping material layer 16 in a manner that avoids air pockets and maintains a uniform material layer thickness.

After the sound damping material layer 16 is applied to the mating surfaces of one or more steel layers 12, 14, the steel layers are brought together under pressure by laminating rolls 60. The laminating rolls, which can be heated or unheated, ensure that the sound damping material layer 16 is fully wetted-out on the two steel layers 12 and 14. An end stop device 62 is used to line up and weld the ends of the two steel layers 12, 14 at the beginning of each roll, thus, end stop device 62 is only used once per coil. During this initial pass, the laminating rolls 60 are left open and the two steel layers 12, 14 are brought through and stopped by device 62 which aligns the ends. Several spot welds are then added to the ends to hold both steel layers together while being pulled through the rest of the line. The laminating rolls 60 are then closed and the sound damping material layer 16 is applied as the laminate continues to run through the rest of the line. Usable laminate will be made from the point where the sound damping material 16 is applied, thus minimizing scrap on start-up.

To ensure that the edges of the sound damping laminate 10 remain adhered together through the curing process, an optional UV edge curing system 64, for example, may be used. According to such an embodiment, focused UV light is directed to the edges of the laminate 10, thereby causing cross-linking of the sound damping material layer 16 at the edges of the steel sheets and up to about 1½" into the laminate (of course, the curing penetration depth of the UV light is affected by both its wavelength and intensity). This optional curing can provide enough green strength to keep the edges from separating during the remainder of the laminating process. Through the following steps, the laminate should be maintained under even pressure to ensure that the steel layers 12, 14 undergo an evenly distributed force and remain in close contact until the cross-linking takes place. Sound damping metal laminate 10 then passes through curing ovens 66 while the layers are still maintained under pressure. The precise curing time is generally dictated by the sound damping material layer's polymer adhesive properties. The rest of the cross-linking of sound damping material layer 16 can take place entirely by heat, anaerobically or by a combination of the two. After the curing process, the sound damping metal laminate 10 is allowed to cool, is reoiled at oiling station 68, and is recoiled into coils 70 for storage and/or shipment. If necessary, a crop and shear station 72 can be used to cut the laminate to a certain length and to trim off any unlaminated scrap material at the head and tail of the coil. It is envisioned that the entire curing process may not necessary take place in the laminating line, as further curing may take place afterwards, once the finished product is rolled up It is to be understood that the foregoing description is not a description of the invention itself, but of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A sound damping material for use in a sound damping structure having at least one rigid layer, comprising:
    an acrylate-based polymer matrix for adhering to the rigid layer(s) of the sound damping structure and being the reaction product of at least one acrylate-based monomer having a molecular weight of about 100 to 400 (Mw), said acrylate-based polymer matrix being at least partially cross-linked;
    one or more curing agents dispersed in said acrylate-based polymer matrix, and
    at least one material selected from the group consisting of a precipitated phase and a viscous phase, wherein:
        said precipitated phase is a rubber-like material that provides elasticity to said sound damping material and is dispersed in said acrylate-based polymer matrix, said precipitated phase being at least partially amorphous, and;
        said viscous phase is a fluidic or semi-fluidic material that provides viscosity to said sound damping material and is dispersed in said acrylate-based polymer matrix, said viscous phase also being at least partially amorphous.

2. The sound damping material of claim 1, wherein said acrylate-based monomer comprises about 10% to 95%, by weight, of said sound damping material.

3. The sound damping material of claim 1, wherein said acrylate-based monomer is isobornyl acrylate.

4. The sound damping material of claim 1, wherein said acrylate-based polymer matrix is the reaction product of at least one acrylate-based monomer and at least one acrylate-based oligomer.

5. The sound damping material of claim 4, wherein said acrylate-based oligomer has a molecular weight of about 1,000 to 5,000 (Mw), a room temperature viscosity of about 500 to 50,000 cPs, and a glass transition temperature (Tg) of about −44° C. to 185° C.

6. The sound damping material of claim 4, wherein said acrylate-based oligomer is urethane acrylate.

7. The sound damping material of claim 1, wherein said precipitated phase has a molecular weight of about 4,000-10,000 (Mw) and provides elasticity to said sound damping material.

8. The sound damping material of claim 1, wherein said precipitated phase comprises about 1% to 40%, by weight, of said sound damping material.

9. The sound damping material of claim 1, wherein said viscous phase has a room temperature viscosity of about 1,000 to 1,000,000 cPs.

10. The sound damping material of claim 1, wherein said viscous phase comprises about 5%-60%, by weight, of said sound damping material.

11. The sound damping material of claim 1, wherein said sound damping material further includes a plurality of conductive particles for promoting electrical conductivity through said sound damping material.

12. The sound damping material of claim 1, wherein said sound damping material damps sound in a frequency range of 100 Hz to 1,000 Hz to an extent greater than 0.1 CLF when in temperature conditions of 0° C. to 60° C., and includes the following precursor materials: 1-30% wt. of isobornyl acrylate (acrylate-based monomer), 70-95% wt. of urethane acrylate (acrylate-based oligomer), and 1-10% wt. of acrylic terpolymer (viscous phase).

13. The sound damping material of claim 1, wherein said sound damping material damps sound in a frequency range of 100 Hz to 1,000 Hz to an extent greater than 0.1 CLF when in temperature conditions of 50° C. to 110° C., and includes the following precursor materials: 20-70% wt. of isobornyl acrylate (acrylate-based monomer), and 5-25% wt. of at least one material selected from the group consisting of chlorosulfonated polyethylene and styrene ethylene/butylene copolymer (precipitated phase).

14. The sound damping material of claim 1, wherein said sound damping material is sandwiched between first and second metal layers to form a sound damping laminate having an overall thickness of about about 0.030 inches to 0.080 inches.

15. The sound damping material of claim 14, wherein said sound damping laminate is used to form an automotive structural panel.

16. A method for preparing a sound damping material for application to one or more rigid layers of a sound damping structure, comprising the steps of:
  (a) preparing a solution by providing at least one acrylate-based monomer having a molecular weight of, about 100 to 400 (Mw);
  (b) adding at least one material selected from the group consisting of a precipitated phase and a viscous phase to said solution, wherein (i) said precipitated phase is a miscible rubber-like material that is at least partially amorphous and provides elasticity to said sound damping material, and (ii) said viscous phase is a miscible fluidic or semi-fluidic material that is at also at least partially amorphous and provides viscosity to said sound damping material;
  (c) adding one or more curing agent(s) to said solution, and;
  (d) polymerizing said solution so that it becomes a polymer matrix that is at least partially cross-linked.

17. A method for producing a sound damping laminate, comprising the steps of:
  (a) uncoiling first and second thin metal layers from first and second coils, each of said thin metal layers has a thickness of about 0.015 inches to 0.040 inches;
  (b) applying a sound damping material to at least one of said first and second thin metal layers, wherein said sound damping material includes the following precursor materials:
    (i) an acrylate-based polymer matrix that is the reaction product of at least one acrylate-based monomer having a molecular weight of about 100 to 400 (Mw),
    (ii) one or more curing agents, and
    (iii) at least one material selected from the group consisting of a precipitated phase and a viscous phase, wherein said precipitated phase is a rubber-like material that provides elasticity to said sound damping material and is at least partially amorphous, and said viscous phase is a fluidic or semi-fluidic material that provides viscosity to said sound damping material and is at least partially amorphous;
  (c) applying pressure to said first and second thin metal layers so that said sound damping layer is sandwiched therebetween, and;
  (d) applying heat so that said sound damping layer is at least partially cross-linked and adheres said first and second thin metal layers together.

* * * * *

UNITED STATES PATENT AND TRADEMARK OFFICE
CERTIFICATE OF CORRECTION

| | | |
|---|---|---|
| PATENT NO. | : 7,973,106 B2 | Page 1 of 1 |
| APPLICATION NO. | : 11/918420 | |
| DATED | : July 5, 2011 | |
| INVENTOR(S) | : Jonathan W. Fisk et al. | |

It is certified that error appears in the above-identified patent and that said Letters Patent is hereby corrected as shown below:

In the patent, column 5, line 19, after "it" delete "dissolve" and insert --dissolves--

In the patent, column 5, line 60, after "polyisocianate" delete "derivaive" and insert --derivative--

In the patent, column 8, line 43, delete "01" and insert --0.1--

In the patent, column 9, line 48, after "2.5" insert --% wt--

In the patent, column 9, line 51, after "Examples" delete "II" second occurrence, and insert --III--

In the patent, column 9, line 52, after "of", delete "isopropyl acryl ate" and insert --isopropyl acrylate--

In the patent, column 9, line 53, after "urethane" delete "acryl ate" and insert --acrylate--

In the patent, column 9, line 54, after "ate-based" delete "bloomer" and insert --oligomer--

In the patent, column 11, line 58, after "not" delete "necessary" and insert --necessarily--

In the patent, column 12, line 13, after "meaning" delete "that" second occurrence In the patent, column 12, claim 1, line 36, after "and" delete ";"

In the patent, column 13, claim 14, line 28, after "of" delete "about" second occurrence In the patent, column 13, claim 16, line 37, after "of" delete ","

In the patent, column 14, claim 16, line 5, after "is" delete "at"

Signed and Sealed this
Fifteenth Day of November, 2011

David J. Kappos
*Director of the United States Patent and Trademark Office*